United States Patent [19]

Phillips, Jr. et al.

[11] 3,965,010
[45] June 22, 1976

[54] METAL FILTER FOR MELT SPINNING PACKS

[75] Inventors: William Lewis Phillips, Jr., Wilmington; Ernest Alan Uebler, Newark, both of Del.

[73] Assignee: E. I. Du Pont de Nemours and Company, Wilmington, Del.

[22] Filed: Feb. 4, 1975

[21] Appl. No.: 547,018

[52] U.S. Cl. .............................. 210/283; 210/317; 425/199
[51] Int. Cl.² ......................................... B01D 23/10
[58] Field of Search .......... 75/126 Q; 210/266, 282, 210/283, 289, 291, 446, 496, 510, 317; 425/197, 198, 199

[56] References Cited
UNITED STATES PATENTS

| | | | |
|---|---|---|---|
| 2,200,545 | 5/1940 | Feild | 75/126 Q |
| 2,883,261 | 4/1959 | McGeorge | 210/283 |
| 3,074,104 | 1/1963 | Stanley | 425/197 |
| 3,729,279 | 4/1973 | Mott | 425/198 |
| 3,788,486 | 1/1974 | Bergstrom | 210/496 |
| 3,876,475 | 4/1975 | Ramquist | 75/126 Q |
| 3,896,028 | 7/1975 | Phillips | 210/282 |

FOREIGN PATENTS OR APPLICATIONS

| | | |
|---|---|---|
| 2,045,478 | 2/1971 | France |
| 1,294,742 | 11/1972 | United Kingdom |

*Primary Examiner*—Charles N. Hart
*Assistant Examiner*—Ivars Cintins

[57] ABSTRACT

A sintered porous metal filter having upper and lower surfaces with grooves in the filter alternately in communication with the upper and lower surfaces is strengthened by filling the grooves with granular material. The filter is formed from an alloy containing 30 to 40 percent by weight chromium, about 3 percent by weight silicon, minor amounts of carbon and nitrogen and the remainder iron.

1 Claim, 3 Drawing Figures

METAL FILTER FOR MELT SPINNING PACKS

BACKGROUND OF THE INVENTION

This invention is related to spinning packs for the production of synthetic fibers from polymer melts. More particularly, the invention is an improved filter to be used in the spinning pack.

A conventional spinning pack assembly for the extrusion of synthetic fibers includes a large central cavity containing filter media through which molten plastic material is forced at extrusion pressures. A spinneret disc is attached to the spinning pack assembly and contains small orifices for extrusion of individual fiber strands. Various filter media are placed in the cavity above the spinneret disc to shear the polymer and to filter out foreign particles which might clog the spinneret orifices. The filter media may be of loose material, for example, metal filings or sand, or may be a sintered metal disc.

In studies of polymer flow through various kinds of filtration media, it has been discovered that the surface area available for filtration is one of the most critical variables in the process. The greater the filtration surface area, the higher the capacity of the filter to collect impurities. A desirable method of increasing the effective filtration area is to use sintered porous filters made in a variety of geometric shapes.

U.S. Pat. No. 3,729,279 shows a configuration of upstanding concentric rings containing outflow bores. While these filters are an improvement by providing a greater surface area for filtration than the previous particulate material normally used, they still are not completely satisfactory because as the number of concentric grooves increases the wall thickness between each groove necessarily decreases thus weakening the filter making it susceptible to collapse when operating at high pressure.

SUMMARY OF THE INVENTION

A filter comprising a sintered porous metallic structure having upper and lower surfaces and grooves alternately in communication with said upper and lower surfaces; granular material within said grooves; and means for retaining said granular material in said grooves.

DETAILED DESCRIPTION OF THE ILLUSTRATED EMBODIMENTS

Figure 1:
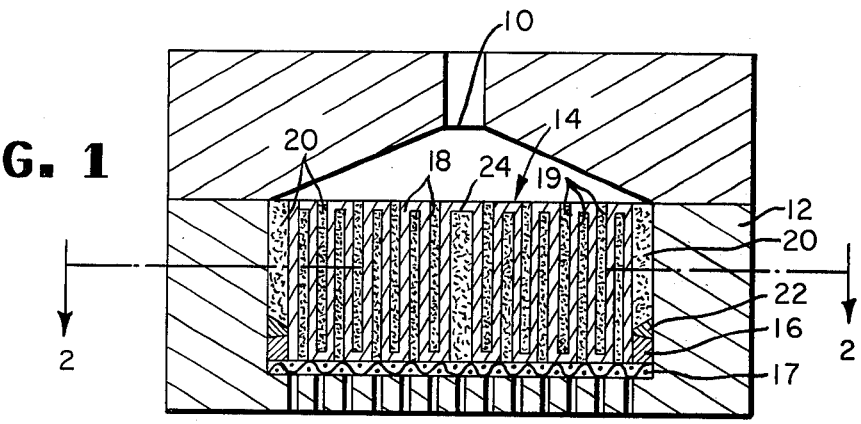
FIG. 1 is a longitudinal section of a spinneret pack assembly according to this invention.

FIG. 1 shows in sectional view a spinning pack constructed in accordance with the present invention. A conically-shaped polymer inlet duct 10 communicates with a source of molten polymer being supplied at a controlled rate and under pressure. The inlet duct portion is attached by suitable means to a filter holder 12 containing a filter element 14.

In this geometric form the filter element 14 comprises a plurality of concentric wall members 18 disposed about an inverted cylindrically-shaped cup 24 which define between them a plurality of nested annular grooves 19 alternately in communication with the upper and lower surfaces of the filter 14. Porous closure of the annular grooves occurs alternately providing a uniform wall thickness over the total filter surface. The grooves 18 are filled with loose granular material 20 which not only provides an improved polymer flow distribution over that which would be obtained if the porous filter element 14 were used alone but also supports the filter element against the high pressure used in polymer filtration. The granular material also reduces the void volume of the pack, thereby reducing the polymer residence time and reducing thermal degradation which may occur in the spinning pack.

The remaining pack elements are conventional in design, the split ring gasket 22 located on top of spacer ring 16 being used to securely retain the porous filter element 14 in position in the holder 12. A circular screen 17 is placed immediately below the porous filter element 14 to retain the granular material 20 in place in the downwardly opening grooves.

Figure 2:
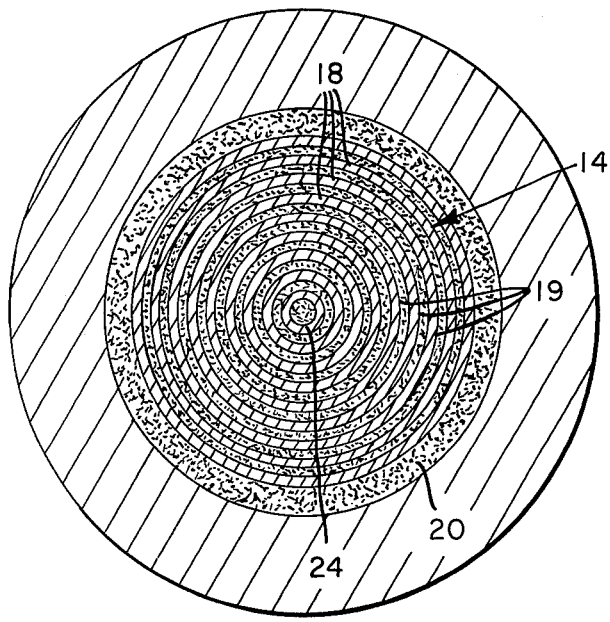
FIG. 2 is a section taken along the lines 2—2 of FIG. 1.

In FIG. 2, the porous wall sections 18 are annularly disposed about the centrally disposed, cylindrically-shaped cup 24 such that the filter has the concentric ring appearance shown.

The individual concentric cylindrical filter walls can be very thin because of the lateral support provided by the granular media. Lateral flow of polymer occurs through the vertical wall as well as axial flow through the horizontal portions. Filtration area extensions many times that of the pack cross-sectional area can be obtained with filter designs of this geometry.

Figure 3:
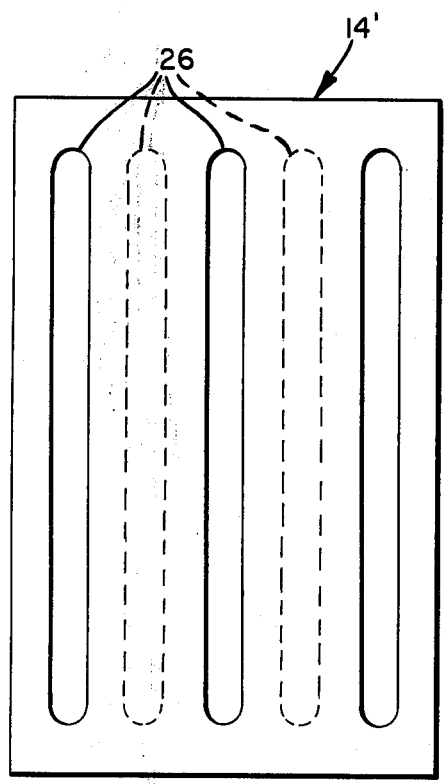
FIG. 3 is a top view of an alternate configuration especially useful with rectangular spinning packs.

The concentric cylinder geometry is preferred for round spinning packs, but alternative geometries may be better suited to spinning packs of nonround configuration. FIG. 3 shows a top view of a filter element 14' for a rectangular pack which consists of parallel slots 26 with the slot openings alternating on the upstream and downstream faces of the filter. A variation could have two series of alternating slots at right angles to each other.

The filter elements are preferably formed of porous metallic material. One manufacturing technique is to mold or press metallic powder into the desired shape under high pressure, followed by sintering by conventional means. This gives a filter whose porosity is about 30 percent. A preferred method of manufacture is to place the granulated metal material in a cup without compaction and to sinter the entire mass in a furnace to produce a solid (porous) metal plug. The plug may then be machined by conventional techniques to provide the annular cylinders shown in the drawing. This method is preferred since it leads to a void space of about 60 percent compared with only about 30 percent when the material is made by the method of precompaction of the powder.

Powdered metals useful in forming filters and loose granular material of this invention include iron, nickel, chromium and the like, and alloys of such metals. Stainless steels are preferred, even more preferred is an alloy containing 30 to 40 percent (pref. 35 ± 1 percent) by weight chromium, 3 ± 1 percent silicon, 100–400 parts per million carbon, and 600–1000 parts per million nitrogen, with the remainder being essentially iron. This alloy has special advantages in its chemical inertness to molten polymer and in resistance to compaction. Although round metal particles may be used, irregularly shaped particles are preferred because the irregular shape leads to greater porosity in the sintered structure.

Particular filtration requirements will dictate the specific particle size of the powdered metals used. Polyamides are usually filtered through finer filters than are polyesters, for example.

What is claimed is:

1. A filter comprising a sintered porous metallic structure having upper and lower surfaces and concentric grooves alternately in communication with said upper and lower surfaces; granular material within said grooves; and means for retaining said granular material in said grooves, said sintered porous metallic structure and said granular material comprising irregularly shaped particles formed from a metal alloy consisting essentially of about 30 percent to about 40 percent by weight chromium; about 2 percent to about 4 percent by weight silicon; 100 to 400 parts per million by weight carbon and 600 to 1000 parts per million by weight nitrogen; and the remainder iron.

* * * * *